US011182413B2

(12) United States Patent
Oota et al.

(10) Patent No.: US 11,182,413 B2
(45) Date of Patent: Nov. 23, 2021

(54) ANALYSIS SYSTEM

(71) Applicant: Hitachi, Ltd., Tokyo (JP)

(72) Inventors: Kazuyuki Oota, Tokyo (JP); Toshiyuki Ukai, Tokyo (JP); Kazuaki Tokunaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 182 days.

(21) Appl. No.: 16/560,714

(22) Filed: Sep. 4, 2019

(65) Prior Publication Data
US 2020/0250211 A1 Aug. 6, 2020

(30) Foreign Application Priority Data

Feb. 5, 2019 (JP) .............................. JP2019-018628

(51) Int. Cl.
*G06F 16/33* (2019.01)
*G06K 9/62* (2006.01)
*G06F 16/909* (2019.01)
*G06F 16/951* (2019.01)
*G06F 16/335* (2019.01)

(52) U.S. Cl.
CPC .......... *G06F 16/334* (2019.01); *G06F 16/335* (2019.01); *G06F 16/909* (2019.01); *G06F 16/951* (2019.01); *G06K 9/623* (2013.01); *G06K 9/6221* (2013.01)

(58) Field of Classification Search
None
See application file for complete search history.

(56) References Cited

U.S. PATENT DOCUMENTS

| | | | |
|---|---|---|---|
| 2013/0182936 A1* | 7/2013 | Yoshihara | G06T 7/11 382/133 |
| 2013/0243244 A1* | 9/2013 | Miyamoto | G06T 7/0014 382/103 |
| 2016/0217253 A1* | 7/2016 | Newman | G16C 20/20 |
| 2016/0378810 A1* | 12/2016 | Takaeda | G06F 16/245 707/741 |
| 2018/0032837 A1* | 2/2018 | Hiroike | G06K 9/00275 |
| 2019/0149565 A1* | 5/2019 | Hagi | G06N 20/00 726/23 |

FOREIGN PATENT DOCUMENTS

JP 2017-10438 A 1/2017

* cited by examiner

*Primary Examiner* — Alford W Kindred
*Assistant Examiner* — Soheila (Gina) Davanlou
(74) *Attorney, Agent, or Firm* — Procopio, Cory, Hargreaves & Savitch LLP

(57) ABSTRACT

An analysis system is configured to acquire data of a first numeric feature combination by referring to the parent population data. The data of the first numeric feature combination includes a score of a target indicator for each of category combinations. Each category combination of the category combinations is composed of categories of the numeric features of the first numeric feature combination. The analysis system is configured to determine a score at coordinates corresponding to each of the category combinations in a space having each of the numeric features of the first numeric feature combination as an axis, calculate a gradient feature vector representing a gradient for the score in the space, and determine, based on the gradient feature vector, whether to include the first numeric feature combination in numeric feature combinations to be extracted from the parent population data.

13 Claims, 15 Drawing Sheets

| NUMERIC FEATURE 1 ∠311 | CATEGORY OF NUMERIC FEATURE 1 ∠312 | NUMERIC FEATURE 2 ∠313 | CATEGORY OF NUMERIC FEATURE 2 ∠314 | KPI EFFECT INDICATOR ∠315 | APPLICABLE SAMPLE COUNT ∠316 |
|---|---|---|---|---|---|
| INCREASING TEMPERATURE PACE | 6.5°C/h OR LESS | COOLING TIME | 105~110 SECONDS | 0.981 | 1,211 |
| INCREASING TEMPERATURE PACE | 6.5~8.5°C/h | COOLING TIME | 110 SECONDS OR MORE | 0.955 | 3,871 |
| ･･ | ･･ | ･･ | ･･ | ･･ | ･･ |
| STORAGE TIME | 1h ~ 3.5h | PROCESS START | 10:00~11:30 | 0.324 | 381 |
| DRYING TEMPERATURE | 96°C OR LESS | STORAGE TIME | 1h OR LESS | 0.261 | 4,239 |

NUMERIC FEATURE INFORMATION TABLE ∠131

*FIG. 5*

| NUMERIC FEATURE 1 (321) | NUMERIC FEATURE 2 (322) | GRADIENT MAGNITUDE (323) | GRADIENT DIRECTION (324) | BOUNDARY OF NUMERIC FEATURE 1 (325) | BOUNDARY OF NUMERIC FEATURE 2 (326) | KPI EFFECT INDICATOR (327) | SAMPLE COUNT (328) | DISTRIBUTION TYPE (329) |
|---|---|---|---|---|---|---|---|---|
| INCREASING TEMPERATURE PACE | COOLING TIME | 0.865 | 50.2° | [6.5,8.5,⋯,23.1] | [40,53,⋯,110] | [-0.76,-0.54,⋯,0.93] | [3201,97,⋯,671] | NORMAL |
| INCREASING TEMPERATURE PACE | DENSITY | 0.714 | 72.3° | [6.5,8.5,⋯,23.1] | [1.1,2.0,⋯,3.5] | [0.91,0.56,⋯,-0.12] | [1226,121,⋯,1030] | NORMAL |
| ⋯ | ⋯ | ⋯ | ⋯ | ⋯ | ⋯ | ⋯ | ⋯ | ⋯ |
| STORAGE TIME | PROCESS START | 0.131 | -12.8° | [1,1.5,⋯,4.8] | [9:30,10:00,⋯,13:30] | [0.32,0.31,⋯,-0.01] | [381,4531,⋯,798] | NORMAL |
| DRYING TEMPERATURE | STORAGE TIME | 0.087 | 80.0° | [96,105,⋯,240] | [1,1.5,⋯,4.8] | [0.35,0.26,⋯,0.23] | [4239,132,⋯,78] | NORMAL |

NUMERIC FEATURE TENDENCY INFORMATION TABLE

*FIG. 6*

| CONSTRAINT TARGET NUMERIC FEATURE | CONSTRAINT TYPE | COMBINATION TARGET |
|---|---|---|
| OUTSIDE TEMPERATURE | UNCONTROLLABLE | — |
| MATERIAL KIND | COMBINED OPERATION | DRYING TIME |
| ⋮ | ⋮ | ⋮ |

CONSTRAINT CONDITION TABLE

FIG. 7

| RENDERING CONDITION | CONDITION VALUE |
|---|---|
| DISTRIBUTION TYPE | NORMAL |
| GRADIENT DIRECTION ($\theta$) | 30°~70°, 210°~250° |
| GRADIENT MAGNITUDE (L) | TOP 10 |
| CATEGORY COMBINATION COUNT | 13 |

RENDERING CONDITION TABLE

FIG. 8

ANALYSIS SYSTEM

CLAIM OF PRIORITY

The present application claims priority from Japanese patent application JP2019-018628 filed on Feb. 5, 2019, the content of which is hereby incorporated by reference into this application.

BACKGROUND

This invention relates to extraction of a numeric feature combination from parent population data including data of a plurality of numeric features.

As a background art of this application, for example, there is JP 2017-10438 A. In JP 2017-10438 A, it is disclosed that "This invention is a method of extracting, when a subset in a parent population of data composed of many element values has a correlation with a plurality of elements, the subset from the entire parent population and finding the correlated elements. In particular, this invention is a method of extracting, in a multidimensional space in which data is vector-modeled based on the values of all the elements composing each piece of data, and all of the data included in the parent population is plotted, a subset having a multidimensional correlation from the crude density of the plot, and finding characteristic elements having a correlation in the subset." (Abstract)

SUMMARY

In analysis of big data (e.g., operation process data) including data of many numeric features, it is difficult for an operator to manually extract combinations of numeric features (e.g., parameters in a manufacturing process) that can effectively improve a specific indicator (e.g., quality or yield).

For example, in JP 2017-10438 A, there is disclosed a technology of finding correlated elements (numerical features) from operation data and quality inspection data of a production line having many items. However, in JP 2017-10438 A, there is no disclosure of extracting a combination of elements to be focused on in order to improve the yield. Therefore, there is a demand for a technology that can automatically extract a numeric feature combination to be focused on from parent population data including data of many numeric features.

An aspect of this disclosure is an analysis system, which is configured to extract a numeric feature combination from parent population data including data of a plurality of numeric features, the analysis system comprising: at least one processor; and at least one storage device. The at least one storage device is configured to store the parent population data. The at least one processor is configured to acquire data of a first numeric feature combination by referring to the parent population data. The data of the first numeric feature combination includes a score of a target indicator for each of a plurality of category combinations. Each category combination of the plurality of category combinations is composed of categories of the plurality of numeric features of the first numeric feature combination. The at least one processor being configured to determine a score at coordinates corresponding to each of the plurality of category combinations in a space having each of the plurality of numeric features of the first numeric feature combination as an axis, calculate a gradient feature vector representing a gradient for the score in the space, and determine, based on the gradient feature vector, whether to include the first numeric feature combination in numeric feature combinations to be extracted from the parent population data.

According to at least one embodiment of this invention, a numeric feature combination to be focused on can be extracted from parent population data including data of many numeric features.

BRIEF DESCRIPTION OF THE DRAWINGS

FIG. 5 is a table for showing a configuration example of the numeric feature information table.

FIG. 6 is a table for showing a configuration example of the numeric feature tendency information table.

FIG. 7 is a table for showing a configuration example of the constraint condition table.

FIG. 8 is a table for showing a configuration example of the rendering condition table.

DETAILED DESCRIPTION OF THE PREFERRED EMBODIMENTS

Hereinafter, embodiments of the present invention will be described with reference to the accompanying drawings. It should be noted that embodiments are merely examples for realizing the present invention and does not limit the technical scope of the present invention.

In at least one embodiment of this invention, there is disclosed a technology of automatically extracting a numeric feature combination that is important for a specific indicator from parent population data including data of many numeric features. In at least one embodiment, there is also disclosed a method of presenting information on the extracted numeric feature combination in a mode suitable for analysis by a user. There is now described operation process data, which is big data, as an example of parent population data. Examples of specific indicators are, for example, quality or yield in an operation process.

A computer system, which is an example of at least one embodiment, is configured to extract a parameter combination important for improving an indicator (e.g., quality or yield) from track record data of an operation process including many parameter values. The computer system presents on an output device an image showing a relationship in the track record data between the extracted parameter combination value and the indicator to the user.

In this way, in at least one embodiment, a combination of elements (numeric features) to be focused on is extracted in accordance with an intended purpose, for example, stabilization of yield, from among a very large amount of data (big data), for example, factory operation information, and the information is visualized. As a result, the user can obtain a guideline for achieving his or her purpose, for example, stabilization of yield.

Figure 1:
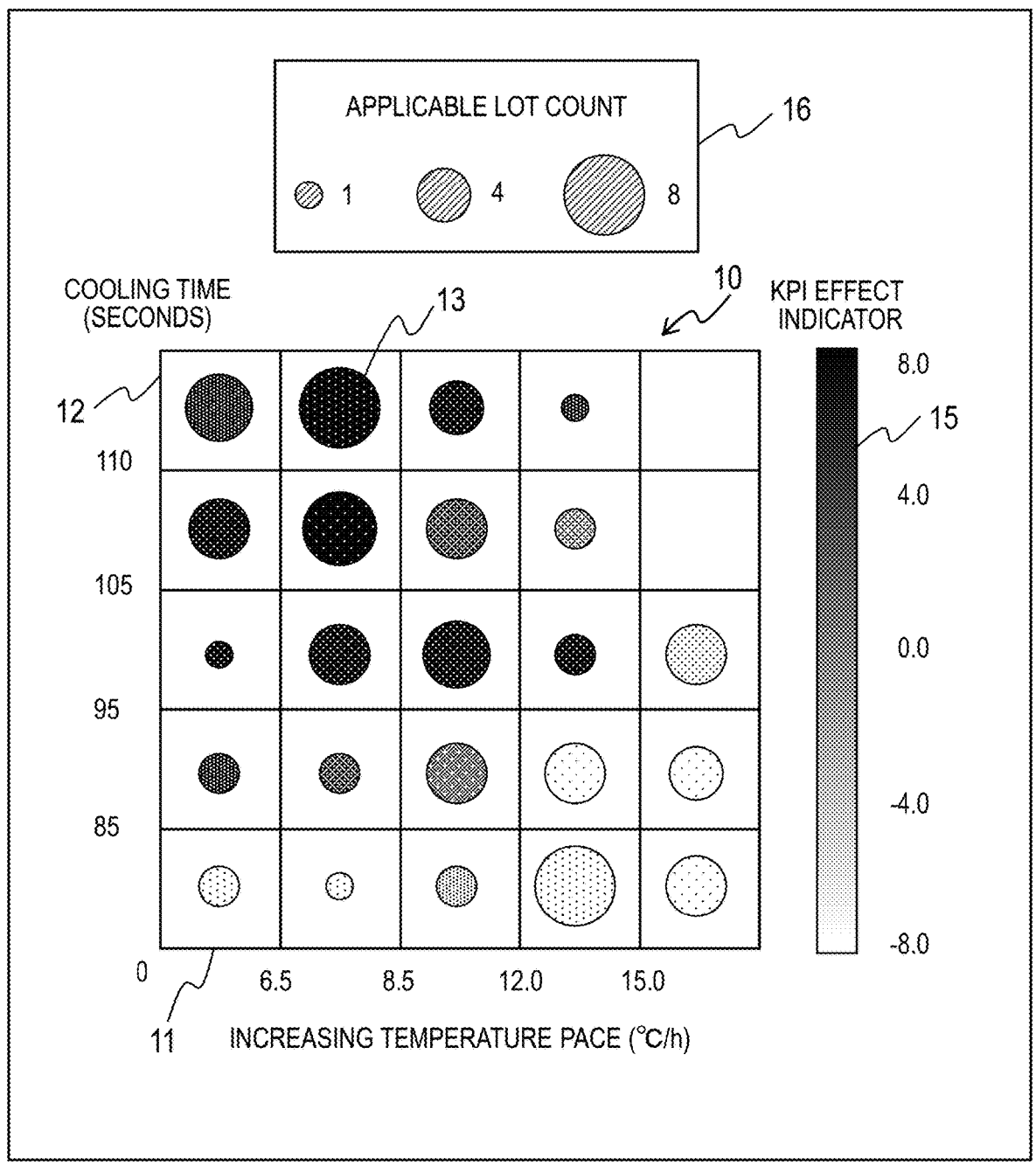
FIG. 1 shows an example of an image for visualizing a relationship between a parameter combination consisting of two parameters and an indicator of an effect on a key performance indicator (KPI) in an operation process.

In FIG. 1, there is shown an example of an image for visualizing a relationship between a parameter combination consisting of two parameters and an indicator of an effect on a key performance indicator (KPI) in an operation process. The image presents to the user a KPI effect indicator (target indicator) for the value (vector value) of the parameter combination. The KPI effect indicator of the parameter combination indicates the relationship between the parameter combination and the KPI, and specifically indicates how much effect is exerted on the KPI in a positive or negative direction.

In the example of FIG. 1, one of the parameters included in the parameter combination is an increasing temperature pace, and the other parameter is a cooling time. The image example of FIG. 1 includes a space image (graph) 10 defined for parameter combinations. The space image 10 represents a relationship between combinations of parameters and the KPI effect indicator by a graphical effect. As a result, the user can know the relationship between a combination of parameters and the KPI effect indicator visually and intuitively.

In the example of FIG. 1, a horizontal axis 11 of the space image 10 indicates the increasing temperature pace, and a vertical axis 12 indicates the cooling time. In the example of FIG. 1, the horizontal axis 11 and the vertical axis 12 are perpendicular to each other, but the angle therebetween is not required to be a right angle. In this example, the space image 10 is divided into a plurality of cells, and an image object 13 is arranged in each cell. Each image object 13 represents a KPI effect indicator score and a sample count by a graphical effect. A cell in which there is no image object 13 means that there is no sample having the condition defined by that cell.

In the example of FIG. 1, the numbers on the horizontal axis 11 and the vertical axis 12 indicate a category boundary value. Each cell is defined by a combination of a category on the horizontal axis 11 and a category on the vertical axis 12. For example, the second cell from the left in the bottom row in the space image 10 is defined by an increasing temperature pace category of more than 6.5° C./h and equal to or less than 8.5° C./h and a cooling time category of more than 85 seconds and equal to or less than 95 seconds. In this way, in the example shown in FIG. 1, the parameter values are represented by the parameter categories. When the size of the category is reduced, the actual measured value and the category can be matched more. In the example described below, similarly, the parameter value is represented by a parameter category.

The information on the sample produced by this category combination is indicated by the image object 13 of the cell. In the example of FIG. 1, the KPI effect indicator indicated by the image object 13 indicates a statistical value for the sample of the category combination. For example, the KPI effect indicator indicates a difference between the KPI average value of the sample under the condition indicated by the cell and the KPI average value of the sample (of another cell) not corresponding to that condition. The KPI is, for example, the yield (product pass rate). Therefore, in one example, a high KPI effect indicator score for a certain cell means that the pass rate is higher than the average pass rate of other cells.

In the example of FIG. 1, the image object 13 represents the KPI effect indicator based on its pattern or color, and represents the sample count based on its size. The image object 13 is arranged at the center of the corresponding cell, and the position of the image object 13 is the coordinates in the space image 10 of the image object 13.

In the example of FIG. 1, when the image object 13 has a larger size, this indicates a larger sample count. In the example of FIG. 1, the image objects 13 are circular, and a larger radius means a larger sample count. In the example of FIG. 1, when the color of the image object 13 is closer to white, this indicates a smaller KPI indicator score, and when the color of the image object 13 is closer to black, this indicates a higher KPI indicator score.

The image object 13 may represent the KPI effect indicator based on, for example, a color gradient (including black and white), cross hatching, or a brightness gradient. The size of the image object 13 may represent the KPI effect indicator, and the pattern or color thereof may represent the sample count. The image object 13 may represent only the KPI effect indicator. The image object 13 may have a shape different from a circular shape. The image object 13 can represent the KPI effect indicator or the sample count based on any graphical effect different from those in this example. The number of parameters included in the parameter combination, that is, the number of space dimensions, may be larger than two.

The image shown in FIG. 1 further includes scales (images) 15 and 16 for the space image 10. The scale 15 is the scale of the KPI effect indicator of the parameter combination. The scale 16 is the sample count scale of the sample count (lot count in this example) of the parameter combination.

The KPI effect indicator scale 15 indicates a correspondence relationship between the KPI effect indicator score (numerical value) and the pattern (color) of the image object 13. In this example, the KPI effect indicator scale 15 has a band shape extending vertically upward, and the pattern (color) changes from bottom to top as the KPI effect indicator score increases. The sample count scale 16 indicates differently sized circles of the image object 13 corresponding to different sample counts. Through display of the scales 15 and 16 having values shown by the image object 13 based on a graphical effect together with the space image 10, the user can easily estimate the numerical value represented by the image object 13.

As shown in FIG. 1, the space image 10 displays the KPI effect indicator score arranged in the space defined by the parameter combination. As a result, the user can easily know how the KPI effect indicator changes due to a change in a parameter combination consisting of a plurality of parameters.

For example, the user can easily recognize whether the KPI effect indicator depends on one or both of the parameters. The space image 10 of FIG. 1 suggests that the KPI effect indicator depends on both the increasing temperature pace and the cooling time. The user can obtain a viewpoint that both the cooling time and the increasing temperature pace are to be controlled in order to improve the KPI effect indicator.

The space image 10 indicates that, when the cooling time is less than 100 seconds by 15 seconds or more, the KPI effect indicator tends to deteriorate by about 5%. In view of this, the user can consider whether to review process conditions/management standards. Further, the space image 10 suggests that the pass rate tends to decrease by about 6% when the cooling time is 95 seconds or less and the increasing temperature pace exceeds 12° C./h. In view of this point, the user can consider whether to plan an alert condition or a countermeasure. In addition, the space image 10 indicates that the KPI effect indicator is small and the sample count is large in the region in which the cooling time is 85 seconds or less and the increasing temperature pace is from 12° C./h to 15° C./h. In view of this point, the user can recognize that a change in the condition of the region leads to an immediate large improvement.

As described above, the user can efficiently discuss how to improve the operation process while referring to the image shown in FIG. 1. In order to generate an image effectively suggesting how to improve the operation process, it is important to select, from among many parameters, an appropriate parameter combination for generating the image. In at least one embodiment, a parameter combination is selected from parent population data based on the gradient of the KPI indicator in the parameter combination space.

Figure 2:
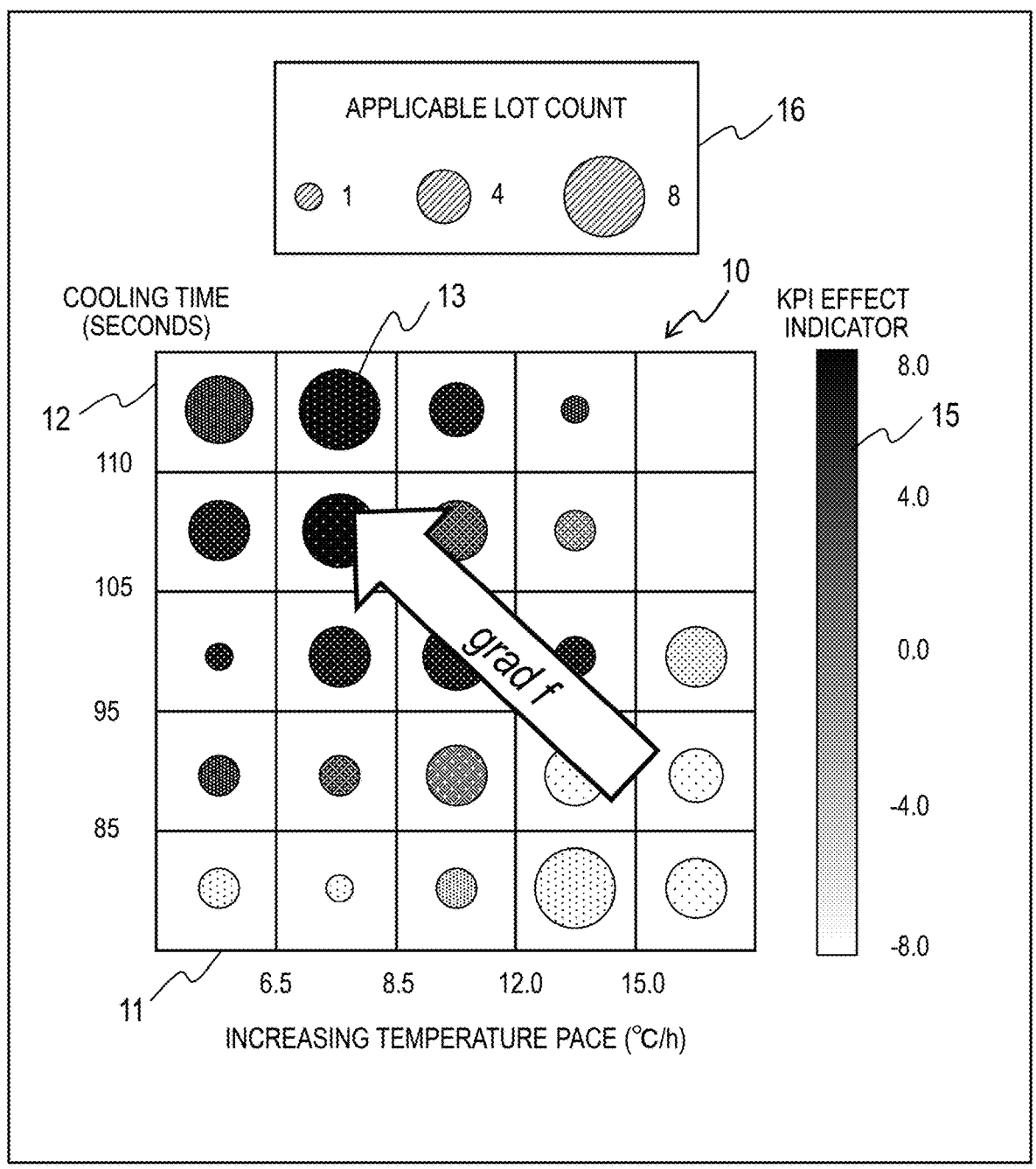
FIG. 2 is a diagram for schematically showing the gradient (grad f) of the KPI effect indicator in the space image.

FIG. 2 is a diagram for schematically showing the gradient (grad f) of the KPI effect indicator in the space image 10. The gradient can be represented by a vector. In the example of FIG. 2, the gradient of the KPI effect indicator is from the lower right to the upper left. A feature vector representing the gradient of the KPI effect indicator in the parameter combination space is referred to as "gradient feature vector". An example of the method of calculating the gradient feature vector is described later.

In the example described below, the gradient feature vector of the KPI effect indicator in a parameter combination (numeric feature combination) space is calculated, and the parameter combination to be extracted from the parent population data is determined based on the calculated gradient feature vector. The gradient feature vector has a magnitude L and an angle (direction) θ. The parameter combination to be presented to the user is extracted based on the magnitude L and/or the angle θ of the gradient feature vector. There is now described an example of a method of determining whether or not to extract a parameter combination based on both L and θ.

Figure 3A:
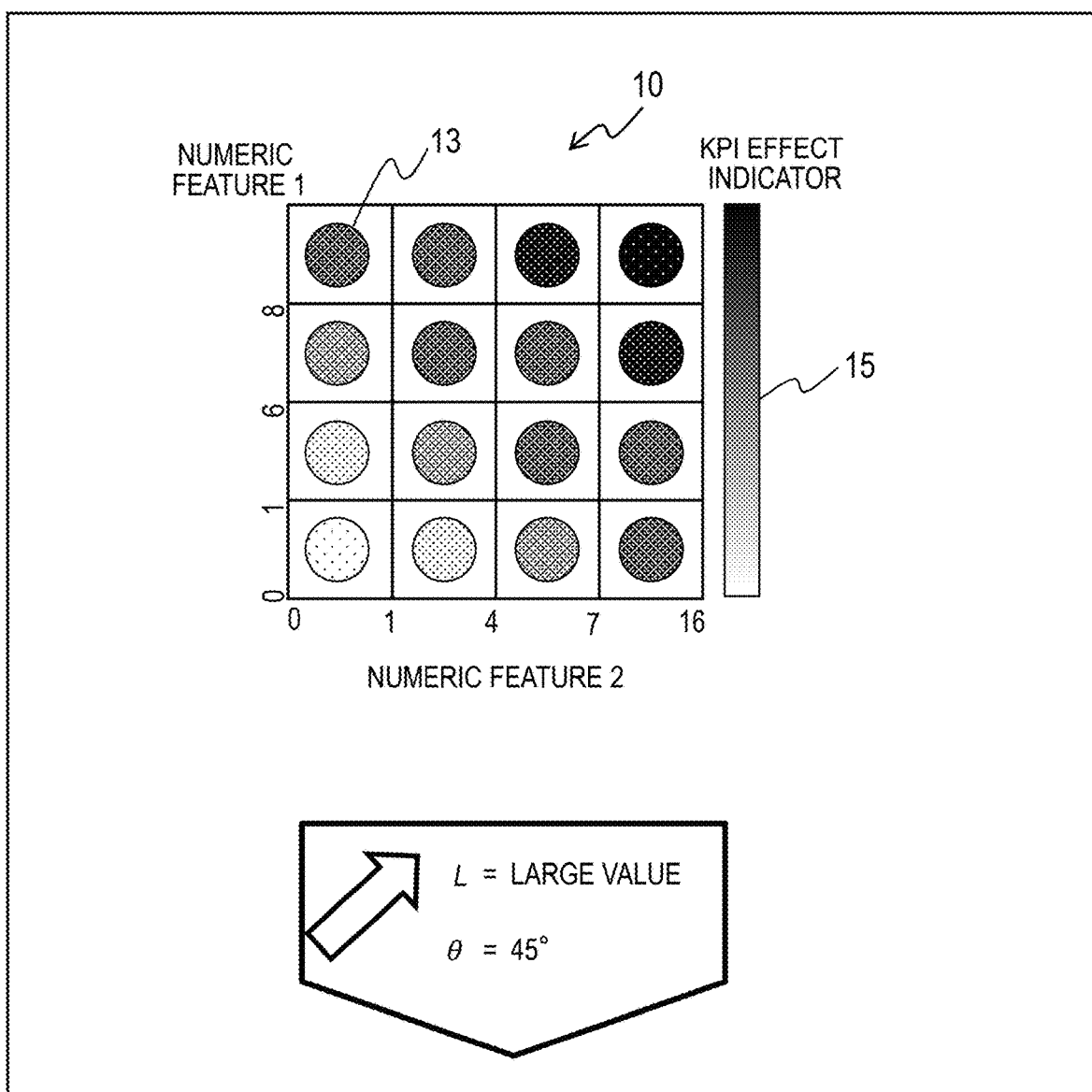
FIGS. 3A, 3B and 3C show examples of the space image having different gradient feature vectors.
Figure 3B:
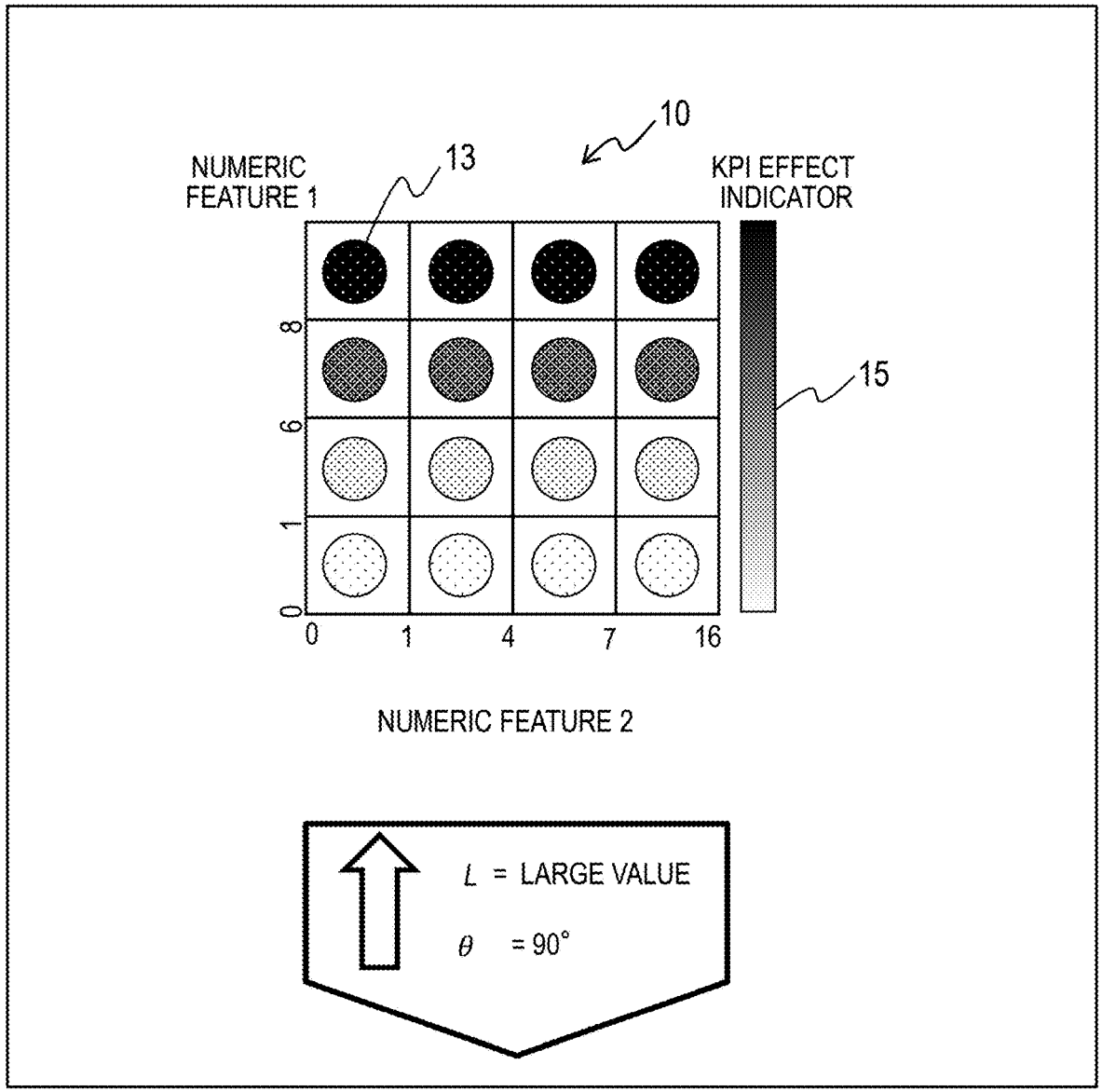
Figure 3C:
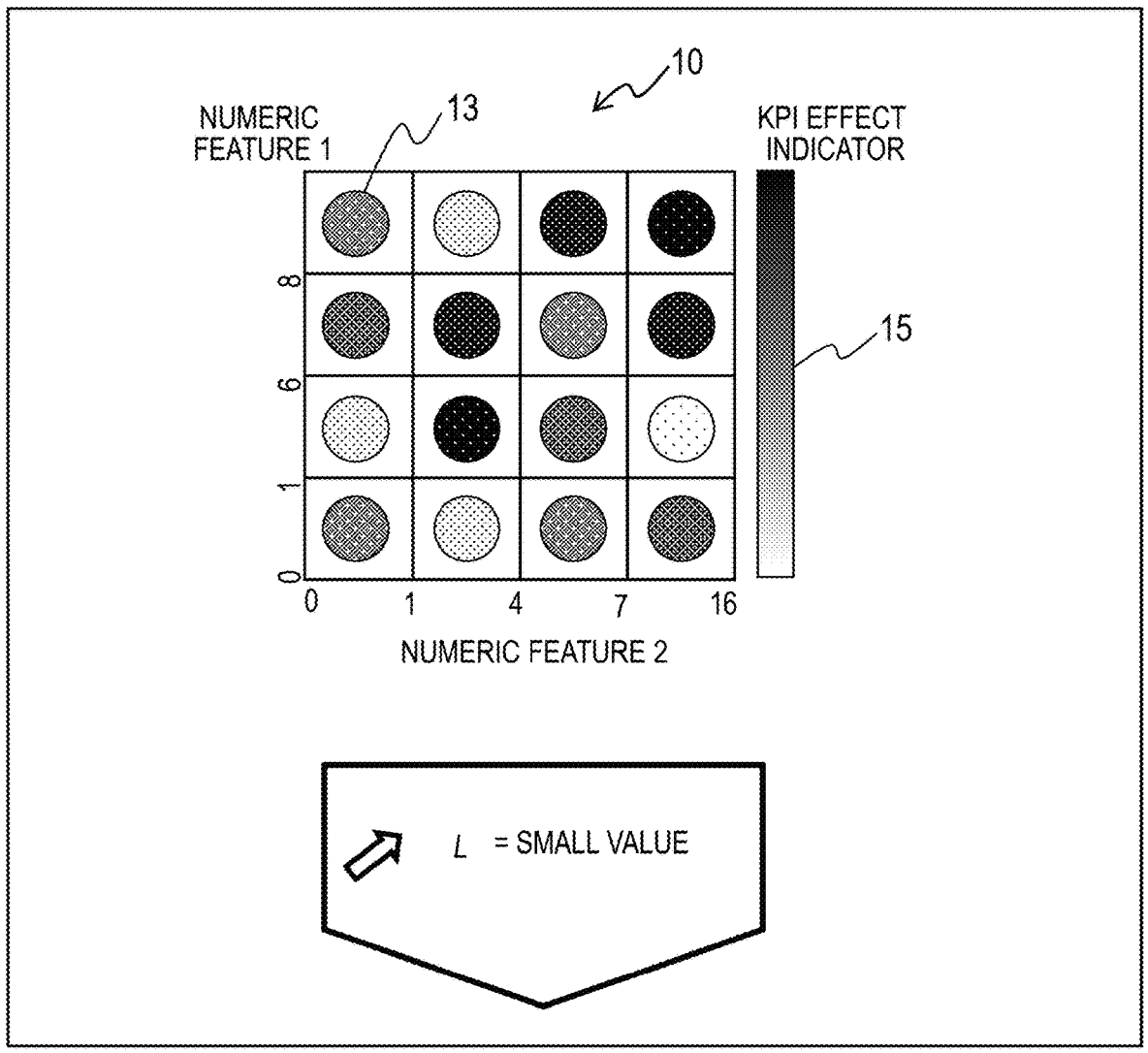

In FIG. 3A, FIG. 3B, and FIG. 3C, there are shown examples of the space image 10 having different gradient feature vectors. In the space image 10 of FIG. 3A, the magnitude L of the gradient feature vector is large, and the angle θ is 45 degrees. The angle is determined with reference to the horizontal axis extending from left to right. In the space image 10 of FIG. 3B, the magnitude L of the gradient feature vector is large, and the angle θ is 90 degrees. In the space image 10 of FIG. 3C, the magnitude L of the gradient feature vector is small.

The magnitude L of the gradient feature vector represents the uniformity (variety) of change in the KPI effect indicator. A large value for L means that the KPI effect indicator monotonically increases or decreases in a specific direction. A small value for L means that the change direction of the KPI effect indicator is not constant, and the KPI effect indicator indicates both an increase and a decrease in any direction.

Therefore, as shown in FIG. 3C, when the magnitude L of the KPI effect indicator is small, it is difficult to identify the direction of parameter change for improving the KPI effect indicator. It is also possible that a change in a parameter intended to improve the KPI effect indicator may actually cause the KPI effect indicator to deteriorate. Therefore, the priority of extracting parameter combinations having a small L is low, and such parameter combinations are not to be extracted by being prioritized over other parameter combinations.

The angle θ of the gradient feature vector indicates a relationship between the dependence of a KPI effect indicator on the parameters. As shown in FIG. 3B, when the gradient feature vector is close to a specific axis in the parameter combination space, it means that the KPI effect indicator is strongly dependent on that specific parameter, and the dependency on other parameters is small. When the KPI effect indicator strongly depends on only a single parameter, the significance of presenting information on the combination of the parameter and another parameter is small.

As shown in FIG. 3A, when the gradient feature vector is separated from each parameter axis, that is, when the gradient feature vector is present near the center between the spatial axes, the KPI effect indicator depends on both of the two parameters. In the example of FIG. 3A, the magnitude L of the gradient feature vector is large, and a measure for improving the KPI effect indicator (change in parameter combination) is easy to understand.

In light of the observations discussed above, in the example described below, the parameter combination to be displayed (extracted) is determined based on the magnitude L and/or the angle θ of the gradient feature vector. In one example method, there is extracted a parameter combination in which the magnitude L of the gradient feature vector is larger than a threshold value determined in advance. Parameter combinations having a magnitude L equal to or less than the threshold value are excluded. In another example method, a predetermined number of numeric feature combinations having a magnitude L among the largest magnitudes may be extracted.

As another example method, there is extracted a parameter combination having an angle θ of the gradient feature vector in a range determined in advance. Parameter combinations having an angle θ outside the range determined in advance are excluded. The range of the angle θ includes a reference axis set at a constant degree from all the axes in the parameter combination space, and excludes an axis for defining the space. As another example method, there may be extracted a predetermined number of numeric feature combinations having an angle θ that is among the closest to a reference axis in the space.

Preferably, in one example of the method of determining the parameter combination to be extracted based on the magnitude L and the angle θ of the gradient feature vector, there is extracted a parameter combination in which the magnitude L of the gradient feature vector is larger than a threshold value determined in advance and the angle θ is in a range set in advance. In this example, parameter combinations having a magnitude L equal to or less than the threshold value are excluded, and parameter combinations having an angle θ outside the range determined in advance are excluded.

As another example method, there may be extracted a predetermined number of numeric feature combinations having an angle θ of the gradient feature vector in a range set in advance and having a magnitude L that is among the largest magnitudes. As another example method, there may be extracted a predetermined number of numeric feature combinations having a magnitude L of the gradient feature vector larger than a threshold value determined in advance and having an angle θ that is among the closest to a reference axis in the space.

Figure 4:
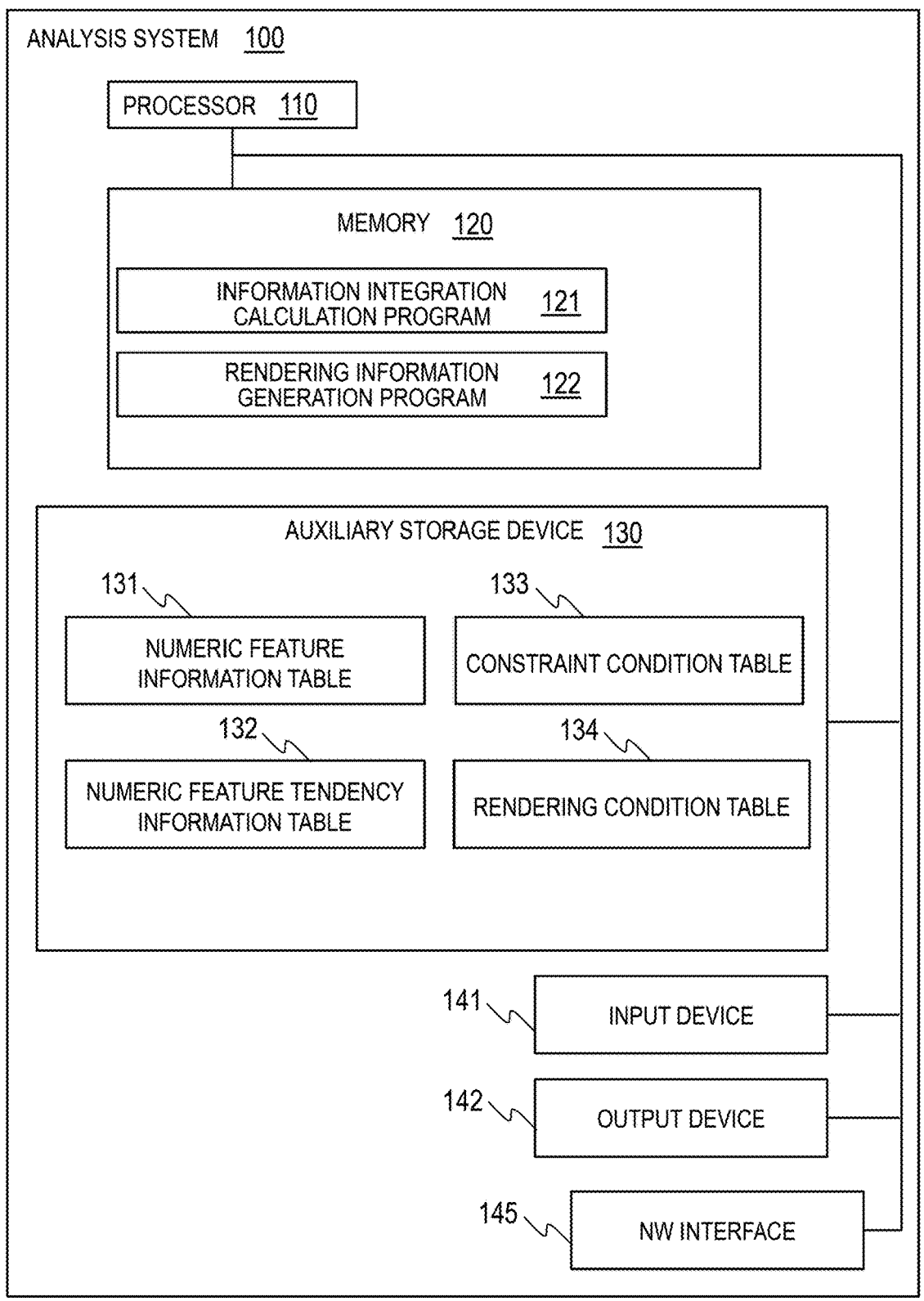
FIG. 4 illustrates an example of an analysis system.

There is now described an example of an analysis system configured to analyze track record data (parent population data) of an operation process, automatically extract an important parameter combination for the KPI effect indicator, and display an image thereof. In FIG. 4, there is illustrated an example of an analysis system 100. The analysis system 100 is constructed from one computer.

The analysis system 100 includes a processor 110, a memory 120, an auxiliary storage device 130, an input device 141, an output device 142, and a network (NW) interface 145. Those components are coupled to each other by a bus. The memory 120, the auxiliary storage device 130, or a combination thereof is a storage device.

The memory 120 is, for example, a semiconductor memory, and is mainly used for storing programs being executed and data. The programs stored in the memory 120 include an information integration calculation program 121 and a rendering information generation program 122.

The processor 110 is configured to execute various types of processing in accordance with the programs stored in the memory 120. Various functional modules are implemented by the processor 110 operating in accordance with the programs. For example, the processor 110 operates as an information integration calculation module and a rendering information generation module in accordance with the above-mentioned respective programs.

The processor 110 can be constructed from a single processing unit or a plurality of processing units, and can include a single or a plurality of calculation units or a plurality of processing cores. The processor 110 may be implemented as one or a plurality of central processing units, a microprocessor, a microcomputer, a microcontroller, a digital signal processor, a state machine, a logic circuit, a graphic processing unit, a system on a chip, and/or any device configured to manipulate signals based on control instructions.

The auxiliary storage device 130 is configured to store a numeric feature information table 131, a numeric feature tendency information table 132, a constraint condition table 133, and a rendering condition table 134. The auxiliary storage device 130 is constructed from a large-capacity storage device such as a hard disk drive or a solid-state drive, and is used to store programs and data for a long period of time.

The programs and data stored in the auxiliary storage device 130 are loaded into the memory 120 at startup or when required, and the various types of processing of the analysis system 100 are executed by the processor 110 executing the programs. Therefore, the processing executed based on a program as described below is processing executed by the processor 110 or the analysis system 100.

The input device 141 is a hardware device for the user to input instructions and information into the analysis system 100. The output device 142 is a hardware device configured to present various images for input and output, and is, for example, a display device or a printing device. The network interface 145 is an interface for coupling to a network.

The analysis system 100 may be constructed from one or more computers including one or more storage devices including one or more processors and a non-transitory storage medium. A plurality of computers communicate to/from each other via a network. For example, a part of the plurality of functions of the analysis system 100 may be implemented on one computer, and another part may be implemented on another computer. The function of executing the analysis processing and the user interface function may be implemented on different computers. The user may access a server having the main functions of the analysis system 100 via a network by using an input device and an output device of a client computer.

FIG. 5 is a table for showing a configuration example of the numeric feature information table 131. The numeric feature information table 131 is configured to store parent population data from which the analysis system 100 extracts an important numeric feature combination. The numeric feature information table 131 includes a numeric feature 1 column 311, a numeric feature 1 category column 312, a numeric feature 2 column 313, a numeric feature 2 category column 314, a KPI effect indicator column 315, and an applicable sample count column 316.

In the example of FIG. 5, there is shown an example of parent population data of a numeric feature combination (parameter combination) formed from two numeric features (parameters). The numeric feature 1 column 311 indicates one numeric feature of the numeric feature combination, and the numeric feature 2 column 313 indicates another numeric feature of the numeric feature combination. The numeric feature 1 category column 312 indicates each category into which the numeric feature 1 is divided. The numeric feature 2 category column 314 indicates each category into which the numeric feature 2 is divided.

The KPI effect indicator column 315 indicates the KPI effect indicator score of a sample applicable to the combination (category combination) of the category of the numeric feature 1 and the category of the numeric feature 2. The sample count column 316 indicates the number of samples applicable to the category combination. One record of the numeric feature information table 131 indicates information on the KPI effect indicator and the sample count in one set of coordinates in the vector space defined by the numeric feature 1 and the numeric feature 2.

In this example, the numeric feature information table 131 prepared in advance indicates the KPI effect indicator score and sample count of a numeric feature combination extracted from the raw data. In another example, each record shown in the numeric feature information table 131 may be extracted from raw data (example of parent population data) as required.

FIG. 6 is a table for showing a configuration example of the numeric feature tendency information table 132. The numeric feature tendency information table 132 is generated from the numeric feature information table 131 by the information integration calculation program 121. The numeric feature tendency information table 132 is configured to store the KPI effect indicator and the sample count of each category combination in the numeric feature combination space, and information on the gradient feature vector of the numeric feature combinations. Each record indicates information on a corresponding one numeric feature combination.

Specifically, the numeric feature tendency information table 132 includes a numeric feature 1 column 321, a numeric feature 2 column 322, a gradient magnitude column 323, a gradient direction column 324, a numeric feature 1 boundary column 325, a numeric feature 2 boundary column 326, a KPI effect indicator column 327, a sample count column 328, and a distribution type column 329.

The numeric feature 1 column 321 and the numeric feature 2 column 322 each indicate a corresponding numeric feature of a numeric feature combination. The gradient magnitude column 323 and the gradient direction column 324 show the magnitude and direction of the gradient feature vector of the numeric feature combination, respectively. The numeric feature 1 boundary column 325 indicates the category boundary of the numeric feature 1, and the numeric feature 2 boundary column 326 indicates the boundary of the numeric feature 2.

The KPI effect indicator column 327 indicates the KPI effect indicator score of each category combination. In the example of FIG. 6, the KPI effect indicator column 327 indicates a plurality of KPI effect indicator scores for each feature combination in a one-dimensional array. Each of those KPI effect indicator scores corresponds to a combination of two numeric feature categories. The plurality of KPI effect indicator scores for each feature combination are represented in a matrix format as described with reference to FIG. 1. The sample count column 328 indicates the sample count of each category combination. The distribution type column 329 indicates the distribution type of the KPI effect indicator in the numeric feature combination space. Details of the distribution type of the KPI effect indicator are described later.

FIG. 7 is a table for showing a configuration example of the constraint condition table 133. The constraint condition table 133 is configured to show constraint conditions set in advance for a numeric feature in the extraction of the numeric feature combination to be presented to the user. In this example, the constraint condition table 133 indicates numeric features or numeric feature combinations to be excluded from the feature combinations to be extracted.

Specifically, the constraint condition table 133 includes a constraint target numeric feature column 331, a constraint type column 332, and a combination target column 333. The constraint target numeric feature column 331 indicates the numeric features to be constrained. The constraint type column 332 indicates the type of constraint. The combination target column 333 indicates the numeric features to be combined with the constraint target numeric feature column 331 when the constraint type column 332 indicates a specific type.

In the example of FIG. 7, a constraint type of "uncontrollable" means that the applicable numeric feature is not artificially controllable in terms of operation, for example, a weather value. It is meaningless to extract an uncontrollable numeric feature, and hence a numeric feature combination including this type of numeric feature is excluded (extraction is prohibited) from the numeric feature combination to be extracted.

A constraint type of "combined operation" is, for reasons such as fixed settings and rules in terms of operation, dependent on the constraint target numeric feature and the combination target numeric feature. In other words, the constraint type of "combined operation" means that the constraint target numeric feature cannot be controlled independently from the combination target numeric feature. This type of numeric feature combination has a low degree of control freedom for improving the KPI effect indicator, and therefore the priority of the extracted numeric feature combination is low. As a result, in this example, the numeric feature combination of this type of numeric feature is excluded (extraction is prohibited) from the numeric feature combination to be extracted. The constraint type is set correspondingly to the parent population data. For example, as another example, there may be a constraint depending on a before-and-after relationship between steps or depending on a human factor.

FIG. 8 is a table for showing a configuration example of the rendering condition table 134. The rendering condition table 134 is configured to show, in addition to a condition of the gradient feature vector of the numeric feature combination extracted for presenting the image, a condition of another extracted numeric feature combination (condition to be excluded from extracted numeric feature combination). Those conditions are each set in advance. In this example, the rendering condition table 134 indicates, in addition to the condition of the gradient feature vector, the condition of the distribution of the KPI effect indicator, specifically, the distribution type and the number of category combinations in which a sample exists.

More specifically, the rendering condition table 134 has a rendering condition column 341 and a condition value column 342. The rendering condition column 341 indicates the type of the condition of the numeric feature combination to be extracted for image display. The condition value column 342 indicates a condition value to be satisfied by the condition indicated by the rendering condition column 341 in order for the numeric feature combination to be extracted.

In the rendering condition column 341, the "distribution type" indicates the type of the distribution of the KPI effect indicator in the feature vector combination space. As described later, the distribution type of the KPI effect indicator may be a concave distribution, a convex distribution, or an ordinary distribution other than those distributions. In the example of FIG. 8, the rendering condition table 134 instructs that numeric feature combinations having a concave distribution or a convex distribution are to be to excluded from the numeric feature combination to be extracted. Through specifying the distribution type, it is possible to extract a specific numeric feature combination to be focused on by the user.

In the example of FIG. 8, the rendering condition table 134 indicates that one of the extraction conditions of the numeric feature combination is that the angle θ of the gradient numeric feature vector is in a range of from 30 degrees to 70 degrees and from 210 degrees to 250 degrees. The rendering condition table 134 instructs that the feature vector combinations having the top 10 magnitude L of the gradient feature vector are to be extracted and an image thereof is to be displayed. Unlike this example, the rendering condition table 134 may define a threshold value of the magnitude L of the gradient feature vector, and exclude numeric feature combinations having a gradient feature vector for which the magnitude L is less than the threshold value.

The rendering condition table 134 further includes, in the extraction conditions, a lower limit value of the number of category combinations in which a sample (data) exists and the KPI effect indicator is determined. When there are many category combinations for which there is no sample, due to the lack of data, it is difficult to consider how this may be reflected in operation. Therefore, numeric feature combinations for which a number of category combinations in which data exists is smaller than the condition value are excluded.

There is now described an example of processing to be executed by the analysis system 100. The analysis system 100 determines the KPI effect indicator score at the coordinates corresponding to each of the plurality of category combinations in a space having each of the plurality of numeric features of each numeric feature combination as an axis, and calculates a gradient feature vector representing the gradient for the KPI effect indicator score in the space. The analysis system 100 then determines, based on the gradient feature vector, whether or not to include a numeric feature combination in the numeric feature combinations to be extracted from the parent population data. As described above, the analysis system 100 determines whether or not to include a numeric feature combination in the numeric feature combinations to be extracted from the parent population data based on the magnitude L and/or the angle (direction) θ of the gradient feature vector.

Figure 9:
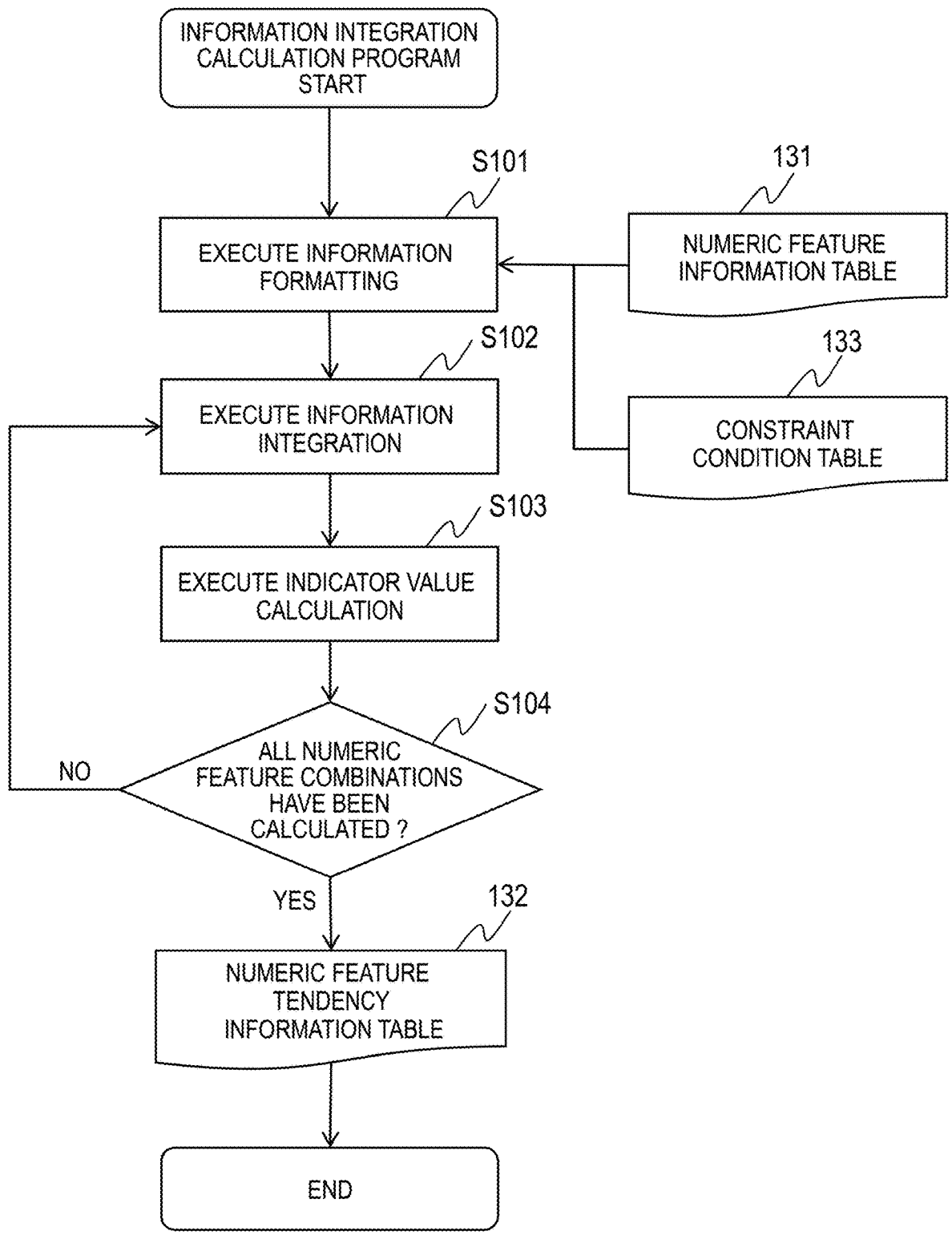
FIG. 9 is a flowchart illustrating a processing example of the information integration calculation program.

FIG. 9 is a flowchart illustrating a processing example of the information integration calculation program 121. In accordance with the flowchart of FIG. 9, the information integration calculation program 121 generates the numeric feature tendency information table 132 from the numeric feature information table 131. The information integration calculation program 121 acquires the numeric feature information table 131, and executes information formatting processing (Step S101). Specifically, the information integration calculation program 121 refers to the constraint condition table 133, and excludes from the numeric feature information table 131 the numeric feature combinations corresponding to the numeric features or numeric feature combinations indicated by the constraint condition table 133.

Next, the information integration calculation program 121 executes information integration processing (Step S102). Specifically, the information integration calculation program 121 integrates the data of one selected numeric feature combination in an N×M matrix format from which a gradient feature vector can be calculated, to thereby form a KPI matrix (N×M). N and M are each the number of categories of the numeric feature in the numeric feature information table 131, and each element of the KPI matrix (N×M) is a KPI effect indicator score of one record in the numeric feature information table 131.

The information integration calculation program 121 then executes indicator value calculation processing (Step S103). Specifically, the information integration calculation program 121 calculates a gradient feature vector (magnitude and direction (angle)) from the numeric feature information in an N×M matrix format. The information integration calculation program 121 adds a record including the information obtained by integrating the numeric feature combinations and the gradient feature vector information to the numeric feature tendency information table 132.

Next, the information integration calculation program 121 determines whether or not the gradient feature vector of all numeric feature combinations has been calculated (Step S104). When there is an unselected numeric feature combination (Step S104: NO), the information integration calculation program 121 returns to Step S102 and selects a new numeric feature combination. When the gradient feature vector of all the numeric feature combinations has been calculated (Step S104: YES), the information integration calculation program 121 outputs the generated numeric feature tendency information table 132 to the auxiliary storage device 130, and ends this processing.

Figure 10:
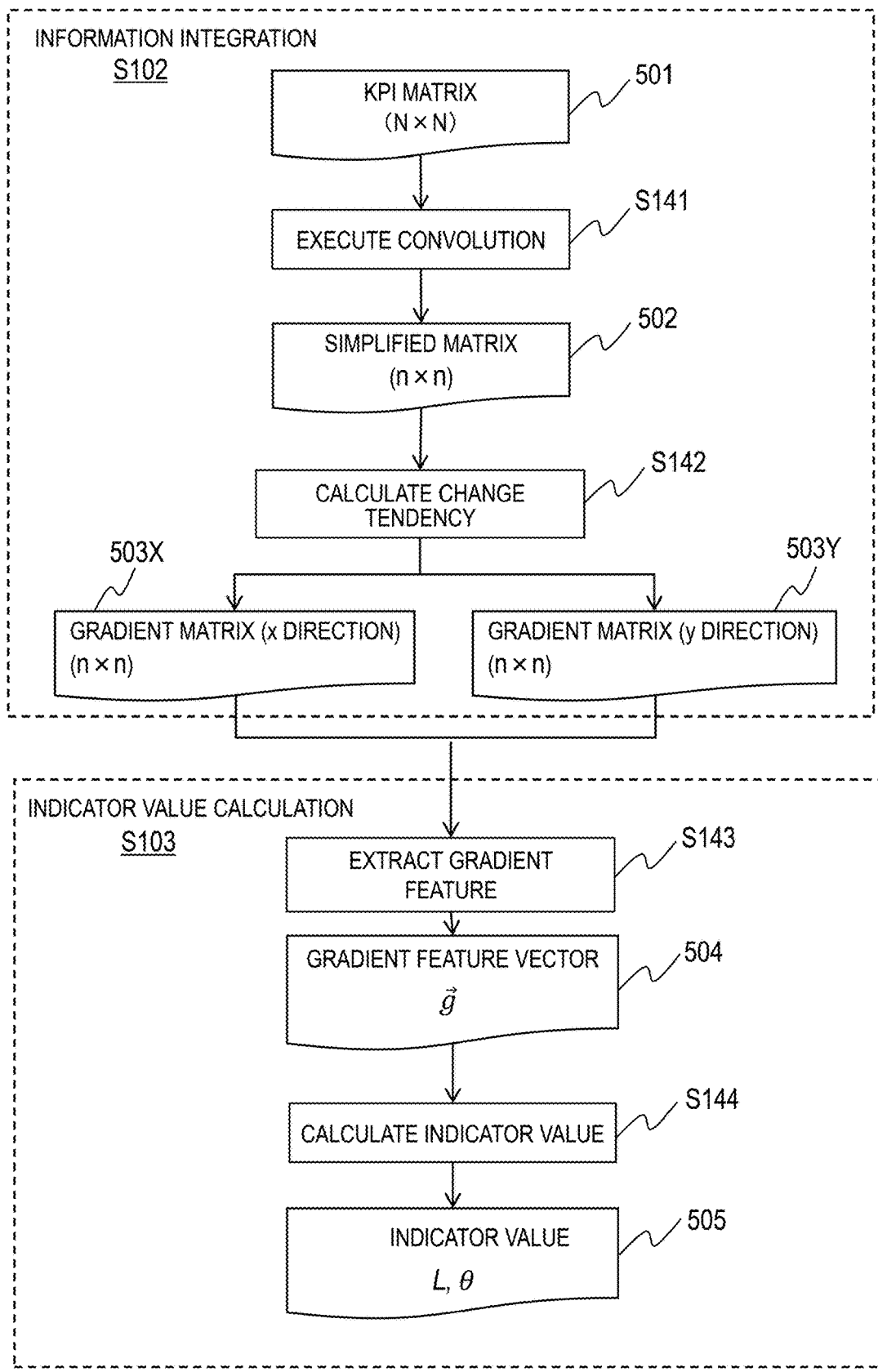
FIG. 10 is a flowchart for illustrating an example of the information integration processing step and the indicator value calculation processing step.

Next, details of each processing step by the information integration calculation program 121 described with reference to FIG. 9 are described. FIG. 10 is a flowchart for illustrating an example of the information integration processing Step S102 and the indicator value calculation processing Step S103. In the KPI matrix of this example, N=M. First, details of the information integration processing Step S102 are described.

The information integration calculation program 121 executes a convolution calculation of the KPI matrix (N×N) generated in the information integration processing Step S102 (Step S141) to generate a simplified matrix (n×n). In this processing, n is a natural number set in advance, and may vary in accordance with the value of N. Next, the information integration calculation program 121 calculates a change tendency in the simplified matrix (n×n) (Step S142). The change tendency in the x direction is represented by a gradient matrix (n×n) 503X in the x direction, and the change tendency in the y direction is represented by a gradient matrix (n×n) 503Y in the y direction.

Next, details of the indicator value calculation processing Step S103 are described. The information integration calculation program 121 extracts a gradient feature from the gradient matrix (n×n) 503X in the x direction and the gradient matrix (n×n) 503Y in the y direction (Step S143), and generates a gradient feature vector g504. The gradient feature vector g504 is the gradient feature vector of the KPI effect indicator in the space of the numeric feature combination to be processed. The information integration calculation program 121 determines an indicator value 505 from the gradient feature vector g504 (Step S144). The indicator value 505 is the magnitude L and the direction (angle) θ of the gradient feature vector g504.

Figure 11:
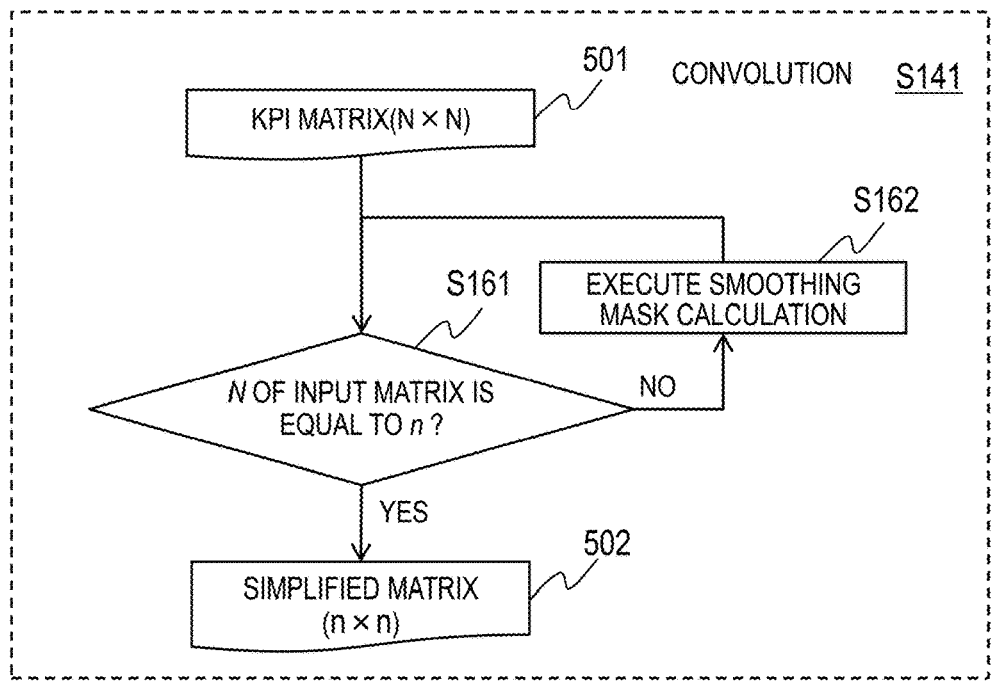
FIG. 11 is a flowchart for illustrating an example of the convolution processing step.

Next, details of each step in the information integration processing Step S102 are described. FIG. 11 is a flowchart for illustrating an example of the convolution processing Step S141. The convolution processing Step S141 simplifies an N×N large matrix into an n×n small matrix.

The information integration calculation program 121 determines whether N of the KPI matrix (N×N) generated in the information integration processing Step S102 is equal to n (Step S161). When N is not equal to n (Step S161: NO), the information integration calculation program 121 executes a smoothing mask calculation of the KPI matrix (Step S162), and returns the processing to Step S161. The information integration calculation program 121 uses a specific kernel K having a size of n×n in the smoothing mask calculation Step S162.

Figure 12:
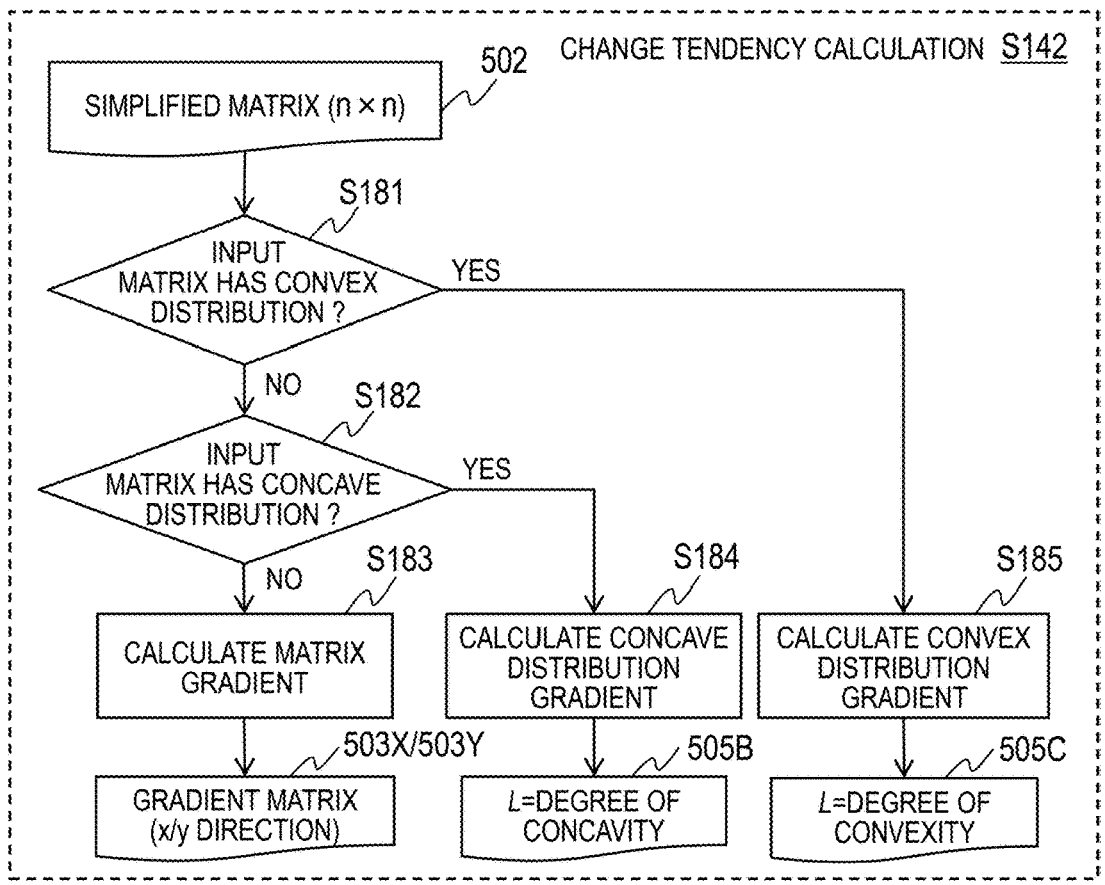
FIG. 12 is a flowchart for illustrating an example of the change tendency calculation processing step.

FIG. 12 is a flowchart for illustrating an example of the change tendency calculation processing Step S142. The change tendency calculation processing Step S142 calculates a gradient of the small matrix of n×n. Further, the change tendency calculation processing Step S142 determines the method for calculating the gradient feature vector based on the distribution of the KPI effect indicators (scores) in the numeric feature combination space. More specifically, the gradient feature vector is calculated by using a special method in the case of a convex distribution in which the center is the highest, or in the case of a concave distribution in which the center is the lowest. As a result, an appropriate gradient feature vector can be calculated in accordance with the distribution.

The information integration calculation program 121 determines whether or not the input simplified matrix (n×n) has a convex distribution (Step S181). Depending on the design, various criteria for determining a convex distribution may be set. For example, when the simplified matrix is a 3×3 matrix, the information integration calculation program 121 may determine that the simplified matrix has a convex distribution when the center value of the simplified matrix is the maximum value. As another example, when the simplified matrix is a 3×3 matrix, the information integration calculation program 121 may determine that the simplified matrix has convex distribution when the center value of the simplified matrix is positive and the values of the other elements are all negative.

In another example, the information integration calculation program 121 may determine that the simplified matrix has a convex distribution when n is an odd number of 3 or more and a number sequence from each outermost element to the central element is monotonically increasing. The (positions of the) elements included in each number sequence are defined in accordance with the design. The information integration calculation program 121 may also determine that the simplified matrix has a convex distribution when n is an even number of 4 or more and the number sequence from each outermost element to one of the four elements at the center is monotonically increasing. The (positions of the) elements included in each number sequence are defined in accordance with the design.

When the simplified matrix has a convex distribution (Step S181: YES), the information integration calculation program 121 executes a convex gradient calculation (Step S185). In the indicator 505C used in the convex gradient calculation, the magnitude L of the gradient feature vector is the degree of convexity, and the direction (angle) 6 is a value defined in advance in order to represent the convex distribution type. The degree of convexity indicates the degree of the convex distribution, and may be suitably defined in accordance with the design. For example, the information integration calculation program 121 may calculate a difference between the value of the central element and the average of the other elements. In another example, the information integration calculation program 121 may determine the degree of convexity to be the difference between the value of the central element and the maximum or minimum value of the other elements, or to be the value of the central element itself. As described above, the direction (angle) is used in order to indicate that the distribution is convex, and the gradient feature (gradient feature vector) of the convex distribution is indicated by its distribution type and degree of convexity.

When the simplified matrix does not have a convex distribution (Step S181: NO), the information integration calculation program 121 determines whether or not the input simplified matrix (n×n) has a concave distribution (Step S182). Depending on the design, various criteria for determining a concave distribution may be set. For example, when the simplified matrix is a 3×3 matrix, the information integration calculation program 121 may determine that the simplified matrix has a concave distribution when the center value of the simplified matrix is the minimum value. As another example, when the simplified matrix is a 3×3 matrix, the information integration calculation program 121 may determine that the simplified matrix has concave distribution when the center value of the simplified matrix is negative and the values of the other elements are all positive.

In another example, the information integration calculation program 121 may determine that the simplified matrix has a concave distribution when n is an odd number of 3 or more and a number sequence from each outermost element to the central element is monotonically decreasing. The (positions of the) elements included in each number sequence are defined in accordance with the design. The information integration calculation program 121 may also determine that the simplified matrix has a concave distribution when n is an even number of 4 or more and the number sequence from each outermost element to one of the four elements at the center is monotonically decreasing. The (positions of the) elements included in each number sequence are defined in accordance with the design.

When the simplified matrix has a concave distribution (Step S182: YES), the information integration calculation program 121 executes a concave gradient calculation (Step S184). In the indicator 505C used in the concave gradient calculation, the magnitude L of the gradient feature vector is the degree of concavity, and the direction (angle) 6 is a value defined in advance in order to represent the concave distribution type. The degree of concavity indicates the degree of the concave distribution, and may be suitably defined in accordance with the design. For example, the information integration calculation program 121 may calculate a difference between the value of the central element and the average of the other elements. In another example, the information integration calculation program 121 may determine the degree of concavity to be the difference between the value of the central element and the maximum or minimum value of the other elements, or to be the value of the central element itself. As described above, the direction (angle) is used in order to indicate that the distribution is concave, and the gradient feature (gradient feature vector) of the concave distribution is indicated by its distribution type and degree of concavity.

When the simplified matrix is not a concave distribution (Step S182: NO), the information integration calculation program 121 executes a matrix gradient calculation (Step S183) to generate the x-direction gradient matrix 503X and the y-direction gradient matrix 503Y.

Next, details of the gradient feature extraction processing Step S143 in the indicator value calculation processing Step S103 are described. In the gradient feature extraction processing Step S143, the x-direction gradient matrix 503X and the y-direction gradient matrix 503Y are each converted into one scalar value (represented by [x] and [y], respectively), and derives the feature vector g=([x], [y]) that has each of the scalar values. The [x] and [y] are values representing the tendency (increase/decrease/no change) of the gradient in the x direction and the y direction, respectively.

Figure 13:
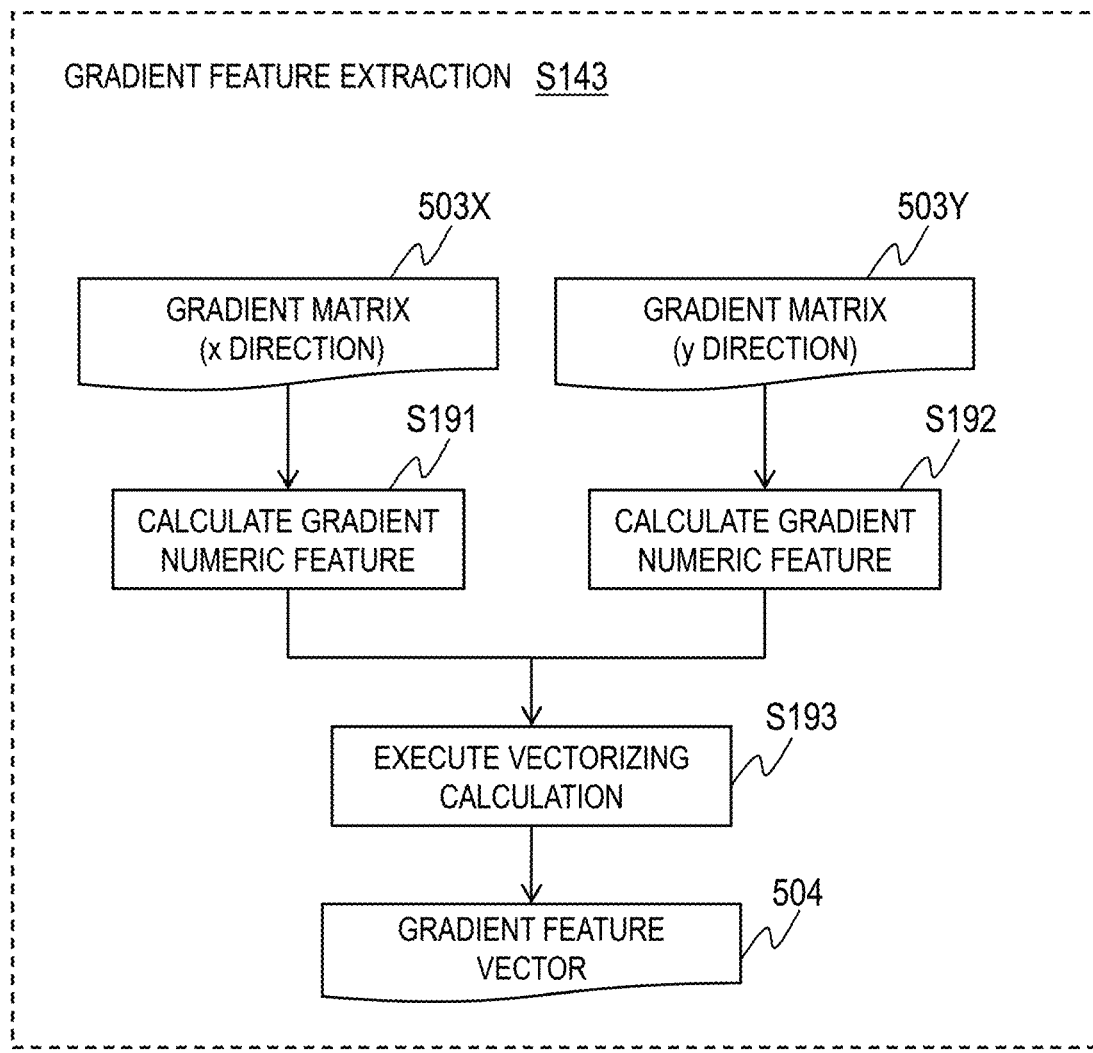
FIG. 13 is a flowchart for illustrating an example of the gradient feature extraction processing step.

FIG. 13 is a flowchart for illustrating an example of the gradient feature extraction processing Step S143. The information integration calculation program 121 calculates a gradient numeric feature for the x-direction gradient matrix 503X (Step S191), and calculates a gradient numeric feature for the y-direction gradient matrix 503Y (Step S192). The method of calculating the gradient numeric features also depends on the design. For example, an average value of the gradient matrix may be output as the numeric feature. As another example, an intermediate value of the gradient matrix may be output as the numeric feature.

The information integration calculation program 121 executes a vectorizing operation using the calculated x-direction gradient numeric feature and the y-direction gradient numeric feature as inputs (Step S193), and generates the gradient feature vector g504. In this example, the x component of the gradient feature vector g504 is a gradient numeric feature in the x direction, and the y component is a gradient numeric feature in the y direction. As described with reference to FIG. 10, the information integration calculation program 121 determines the indicator value 505 including the magnitude L and the angle (direction) 6 from the gradient feature vector g504.

Figure 14:
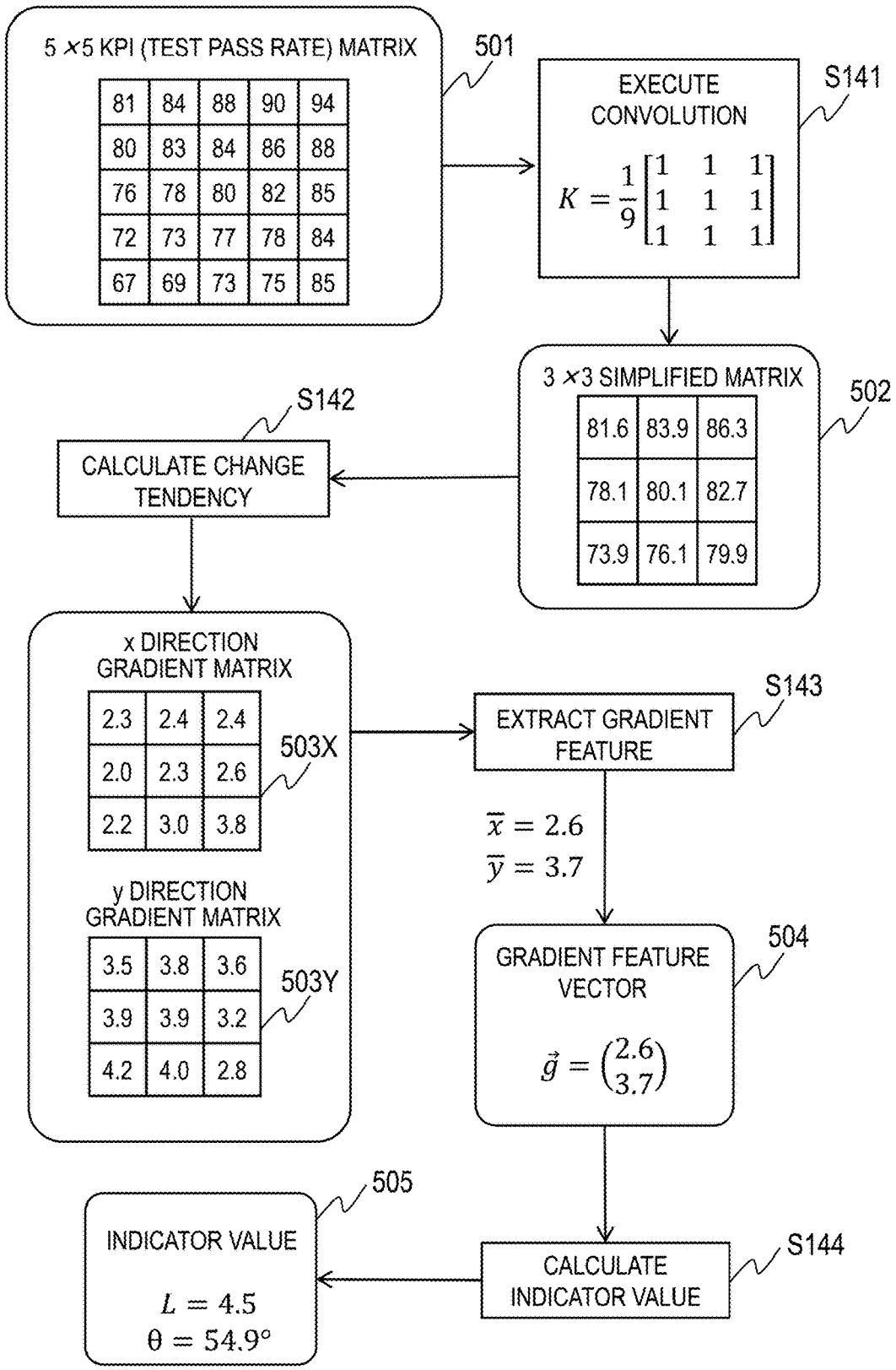
FIG. 14 illustrates a specific example of the processing.

As described above, the information integration calculation program 121 may generate a gradient feature vector from the KPI matrix of a numeric feature combination. There is now described a more specific example of generating the gradient feature vector from the KPI matrix. In FIG. 14, there is illustrated a specific example of the processing. In the example illustrated in FIG. 14, the KPI matrix 501 is a 5×5 matrix. In other words, there are five categories for each numeric feature. Each element of the KPI matrix 501 is a score in the KPI effect indicator column 315 in the numeric feature information table 131.

The simplified matrix 502 is generated from the KPI matrix 501 by the convolution processing Step S141 based on the kernel K. In this example, the kernel K and the simplification matrix 502 are 3×3 matrices. The kernel K is a 3×3 matrix having a coefficient of 1/9 (=3²) in which all elements are 1.

The change tendency calculation processing Step S142 using the simplified matrix 502 as an input generates the x-direction gradient matrix 503X and the y-direction gradient matrix 503Y. In this example, the distribution of the KPI matrix 501 is an ordinary distribution different from a concave or convex distribution, and the x-direction gradient matrix 503X and the y-direction gradient matrix 503Y are calculated. As described with reference to FIG. 13, the calculation applies predetermined gradient calculation in each of the x direction and the y direction in the simplified matrix 502.

As a result of the gradient feature extraction processing Step S143, a gradient numeric feature in the x direction and a gradient numeric feature in the y direction are calculated from the x-direction gradient matrix 503X and the y-direction gradient matrix 503Y, respectively. In this example, the average values of the x-direction gradient matrix 503X and the y-direction gradient matrix 503 are output as an x-direction numeric feature [x] and a y-direction numeric feature [y]. In this example, the x-direction numeric feature [x] is 2.6, and the y-direction numeric feature [y] is 3.7. A gradient feature vector 504 is generated from the x-direction numeric feature [x] and the y-direction numeric feature [y]. In this example, the magnitude L of the indicator value 505 of the gradient feature vector 504 is 4.5 and the angle θ is 54.9 degrees.

Next, the processing of the rendering information generation program 122 is described. The rendering information generation program 122 extracts a record satisfying a specific condition from the records stored in the numeric feature tendency information table 132, and generates and displays an image of the extracted record. An image example of a numeric feature combination is shown in FIG. 1.

Figure 15:
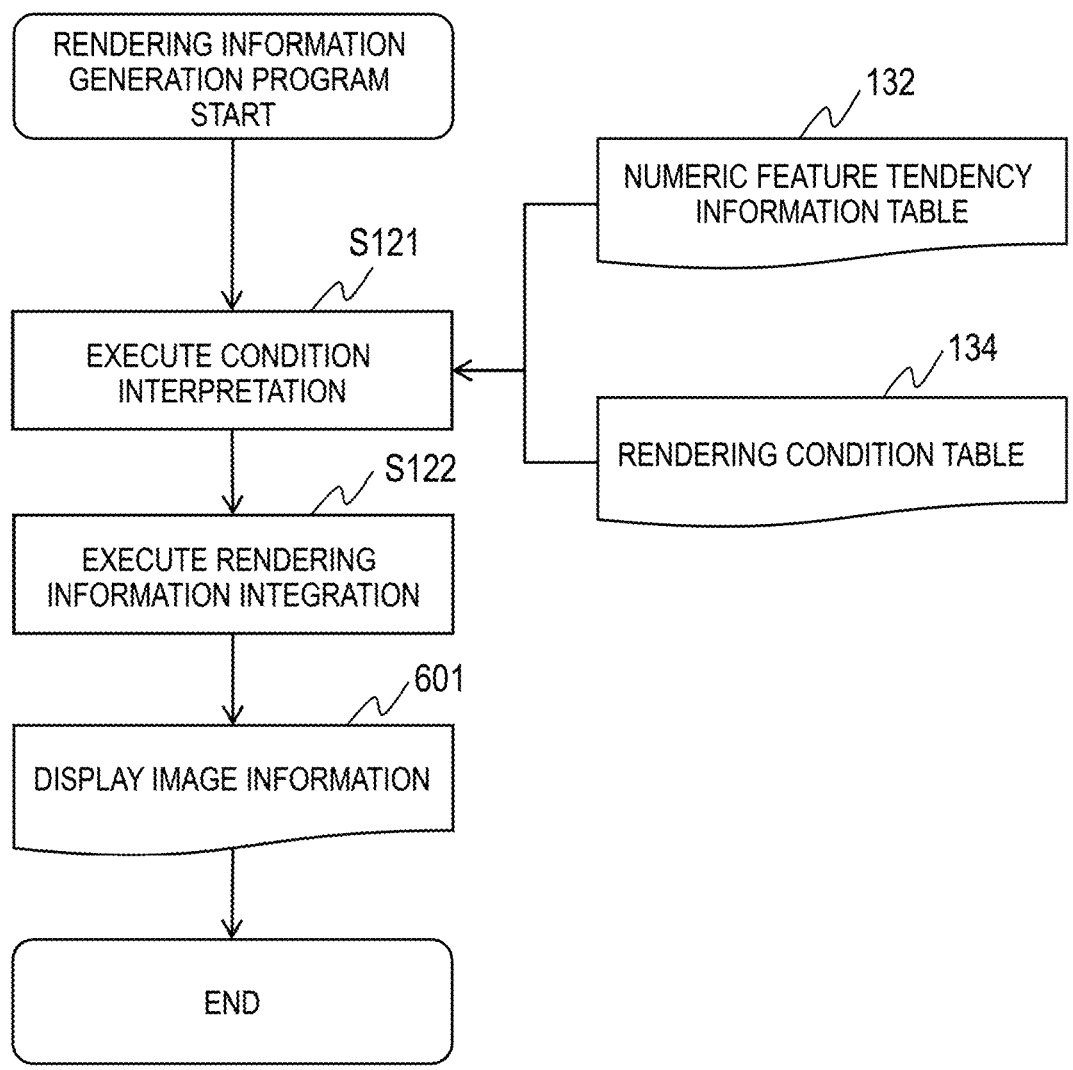
FIG. 15 is a flowchart for illustrating an example of processing to be executed by the rendering information generation program.

FIG. 15 is a flowchart for illustrating an example of processing to be executed by the rendering information generation program 122. First, the rendering information generation program 122 executes condition interpretation processing (Step S121). Specifically, the rendering information generation program 122 extracts from the numeric feature tendency information table 132 a numeric feature combination (record) matching the condition defined in the rendering condition table 134.

Next, the rendering information generation program 122 executes rendering information integration processing (Step S122). Specifically, the rendering information generation program 122 generates, from the extracted information on each numeric feature combination, information 601 on an image including a space image (graph) of the numeric feature combination, and displays the information. For example, the rendering information generation program 122 may sort the extracted numeric feature combinations in descending order of magnitude of the gradient feature vector, and display the images of the numeric feature combinations in that order.

As described above, in at least one embodiment, a large amount of data of an operation process can be analyzed and a parameter combination (numeric feature combination) suitable for investigating the cause of an issue or examining a policy for improving the KPI of the operation process can be extracted. In at least one embodiment, a numeric feature combination that has a significant arrangement and contributes to investigating measures, for example, a numeric feature combination in which both parameters have an effect on the KPI and for which the improvement measure is easy to understand, can be automatically extracted by calculating and referring to a gradient feature vector indicating the magnitude and direction of a change in the KPI effect indicator.

In the above-mentioned example, a numeric feature combination is extracted for image display. However, in another example of at least one embodiment, the numeric feature combination may be applied to extraction for a purpose different from image display. In the above-mentioned example, a numeric feature combination satisfying an extraction rule set in advance is extracted from the numeric feature information table 131 by each of the information integration calculation program 121 and the rendering information generation program 122, but the numeric feature combination may be extracted by only one of the information integration calculation program 121 and the rendering information generation program 122. A numeric feature combination matching both the constraint condition table 133 and the rendering condition table 134 may also be extracted.

A numeric feature combination that is particularly effective for improving the KPI may be extracted by using the constraint condition table 133 and the rendering condition table 134. In another example, a part of the extraction conditions defined by the constraint condition table 133 and the rendering condition table 134 may be omitted. For example, the constraint condition table 133 may be omitted. The distribution type and the category combination count in the rendering condition table 134 may be omitted, and one of the indicators of the gradient feature vector may be omitted.

This invention is not limited to the above-described embodiments but includes various modifications. The above-described embodiments are explained in details for better understanding of The present and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card. The drawings shows control lines and information lines as considered necessary for explanations but do not show all control lines or information lines in the products. It can be considered that almost of all components are actually interconnected.

What is claimed is:

1. An analysis system, which is configured to extract a numeric feature combination from parent population data including data of a plurality of numeric features, the analysis system comprising:
at least one processor; and
at least one storage device,
the at least one storage device being configured to store
the parent population data, the at least one processor being configured to acquire data of a first numeric feature combination by referring to the parent population data, the data of the first numeric feature combination including a score of a target indicator for each of a plurality of category combinations, the at least one processor being configured to:
- determine a space having a plurality of axes, each of the plurality of numeric features of the first numeric feature combination corresponding to a different axis of the plurality of axes;
- define a plurality of cells between the plurality of axes, each cell based on a distinct category combination of the plurality of combinations, each category combination of the plurality of category combinations being composed of a distinct group of categories from each of the plurality of numeric features of the first numeric feature combination, each cell corresponding to a subset of the data of parent population data;
- determine a score for each cell of the plurality of cells corresponding to each of the plurality of category combinations, each score determined based on a difference between an average value of the subset of data of the parent population data for a respective cell and an average value of the remaining data of the parent population data;
- calculate a gradient feature vector representing a gradient for the score in the space; and
- determine, based on the gradient feature vector, whether to include the first numeric feature combination in numeric feature combinations to be extracted from the parent population data.

2. The analysis system according to claim 1, wherein the at least one processor is configured to determine, based on a magnitude of the gradient feature vector, whether to include the first numeric feature combination in the numeric feature combinations to be extracted from the parent population data.

3. The analysis system according to claim 1, wherein the at least one processor is configured to determine, based on an angle of the gradient feature vector, whether to include the first numeric feature combination in the numeric feature combinations to be extracted from the parent population data.

4. The analysis system according to claim 1, wherein the at least one processor is configured to determine a method of calculating the gradient feature vector, based on a distribution of the scores in the space.

5. The analysis system according to claim 1, wherein the at least one processor is configured to exclude, from the numeric feature combinations to be extracted from the parent population data, a numeric feature combination applicable to a condition set in advance, which is different from the gradient feature vector.

6. The analysis system according to claim 5, wherein the condition comprises, as a numeric feature combination prohibited from being extracted from the parent population data, at least one of: a numeric feature combination including a numeric feature in which a value is artificially unchangeable; a numeric feature combination including a numeric feature in which a value is independently unchangeable; or a numeric feature combination having a category combination count, for which the score has been calculated, of less than a threshold value.

7. The analysis system according to claim 1,
wherein the at least one processor is configured to:
- determine the first numeric feature combination as the numeric feature combination to be extracted from the parent population data; and
- generate an image of the space and present the generated image on an output device, and
- wherein the image of the space includes an object indicating the score at the cell corresponding to each of the plurality of category combinations.

8. The analysis system according to claim 7, wherein the object indicates one of a pattern and a color corresponding to each of the scores.

9. The analysis system according to claim 8, wherein the at least one processor is further configured to present, on the output device, a scale indicating one of the color and the pattern corresponding to the score of the object.

10. The analysis system according to claim 7, wherein the object further represents a sample count.

11. The analysis system according to claim 10, wherein the object has a size corresponding to the sample count.

12. The analysis system according to claim 11, wherein the at least one processor is further configured to present, on the output device, a scale having a size corresponding to the sample count of the object.

13. A method of extracting, by an analysis system, a numeric feature combination from parent population data including data of a plurality of numeric features, the analysis system comprising at least one processor and at least one storage device, the at least one storage device being configured to store the parent population data, the method comprising:
- acquiring, by the at least one processor, data of a first numeric feature combination by referring to the parent population data,
- the data of the first numeric feature combination including a score associated with a target indicator for each of a plurality of category combinations;
- determining, by the at least one processor, a space having a plurality of axes, each of the plurality of numeric features of the first numeric feature combination corresponding to a different axis of the plurality of axes;
- defining, by the at least one processor, a plurality of cells between the plurality of axes of the space, each cell based on a distinct category combination of the plurality of combinations, each category combination of the plurality of category combinations being composed of a distinct group of categories from each of the plurality of numeric features of the first numeric feature combination, each cell corresponding to a subset of the data of parent population data;
- determining, by the at least one processor, a score for each cell of the plurality of cells corresponding to each of the plurality of category combinations, each score determined based on a difference between an average value of the subset of data of the parent population data for a respective cell and an average value of the remaining data of the parent population data;
- calculating, by the at least one processor, a gradient feature vector representing a gradient for the score in the space; and
- determining, by the at least one processor, based on the gradient feature vector, whether to include the first numeric feature combination in the numeric feature combinations to be extracted from the parent population data.

* * * * *